(12) United States Patent
Farhan et al.

(10) Patent No.: US 10,678,529 B1
(45) Date of Patent: Jun. 9, 2020

(54) SECURE DEVICE FIRMWARE INSTALLATION

(71) Applicant: Amazon Technologies, Inc., Seattle, WA (US)

(72) Inventors: Munif M. Farhan, Clyde Hill, WA (US); Nafea Bshara, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 202 days.

(21) Appl. No.: 15/827,834

(22) Filed: Nov. 30, 2017

(51) Int. Cl.
| | |
|---|---|
| *G06F 8/65* | (2018.01) |
| *G06F 8/71* | (2018.01) |
| *H04L 29/06* | (2006.01) |
| *H04L 29/08* | (2006.01) |
| *G06F 9/445* | (2018.01) |

(52) U.S. Cl.
CPC .............. *G06F 8/65* (2013.01); *G06F 8/71* (2013.01); *G06F 9/445* (2013.01); *H04L 63/08* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 2009/0193183 | A1* | 7/2009 | Kudo | G11C 7/1027 711/103 |
| 2010/0049901 | A1* | 2/2010 | Chiou | G06F 8/65 711/103 |
| 2011/0131447 | A1* | 6/2011 | Prakash | G06F 21/572 714/19 |
| 2013/0073672 | A1* | 3/2013 | Ayed | G06F 8/61 709/217 |
| 2016/0036956 | A1* | 2/2016 | Debates | G06F 16/951 455/419 |
| 2016/0306616 | A1* | 10/2016 | Tomppo | G06F 8/65 |
| 2016/0328180 | A1* | 11/2016 | Wang | G06F 13/14 |
| 2018/0349129 | A1* | 12/2018 | Ju | G06F 8/658 |
| 2019/0012180 | A1* | 1/2019 | Lai | G06F 9/4403 |

* cited by examiner

*Primary Examiner* — Philip Wang
(74) *Attorney, Agent, or Firm* — Klarquist Sparkman, LLP

(57) ABSTRACT

Technologies are provided for bypassing control logic of an electronic device and writing a trusted firmware to a storage location of the device. The device can comprise a bypass communication channel that, when enabled, allows a connected host computer to access a storage medium and/or onboard memory of the device without using the device's control logic. A device controller can be configured to receive a firmware update mode command from a connected host computer and to enable the bypass communication channel. In at least some embodiments, the controller is configured to reject the update mode command unless it is received as part of an initial communication from the host computer during a boot sequence of the electronic device. In a different or further embodiment, the controller is configured to determine that the command is authorized before enabling the bypass communication channel.

19 Claims, 8 Drawing Sheets

SECURE DEVICE FIRMWARE INSTALLATION

BACKGROUND

Many electronic devices are designed to operate using programmable firmware. Some electronic devices store firmware that comprise executable instructions for performing at least some device operations for the electronic devices. For example, many device manufacturers and suppliers provide their devices with firmware pre-installed. However, for at least some of these devices, it is possible to install different firmware in order to change the behavior of a device. This may be done, for example, if bugs are discovered in the previously installed firmware and/or enhancements are made to the previous firmware's functionality. In at least some cases, functionality for performing a firmware update is provided by the firmware currently installed on the device (i.e., the firmware currently installed on the device is used to install a new firmware).

DETAILED DESCRIPTION

Figure 1:
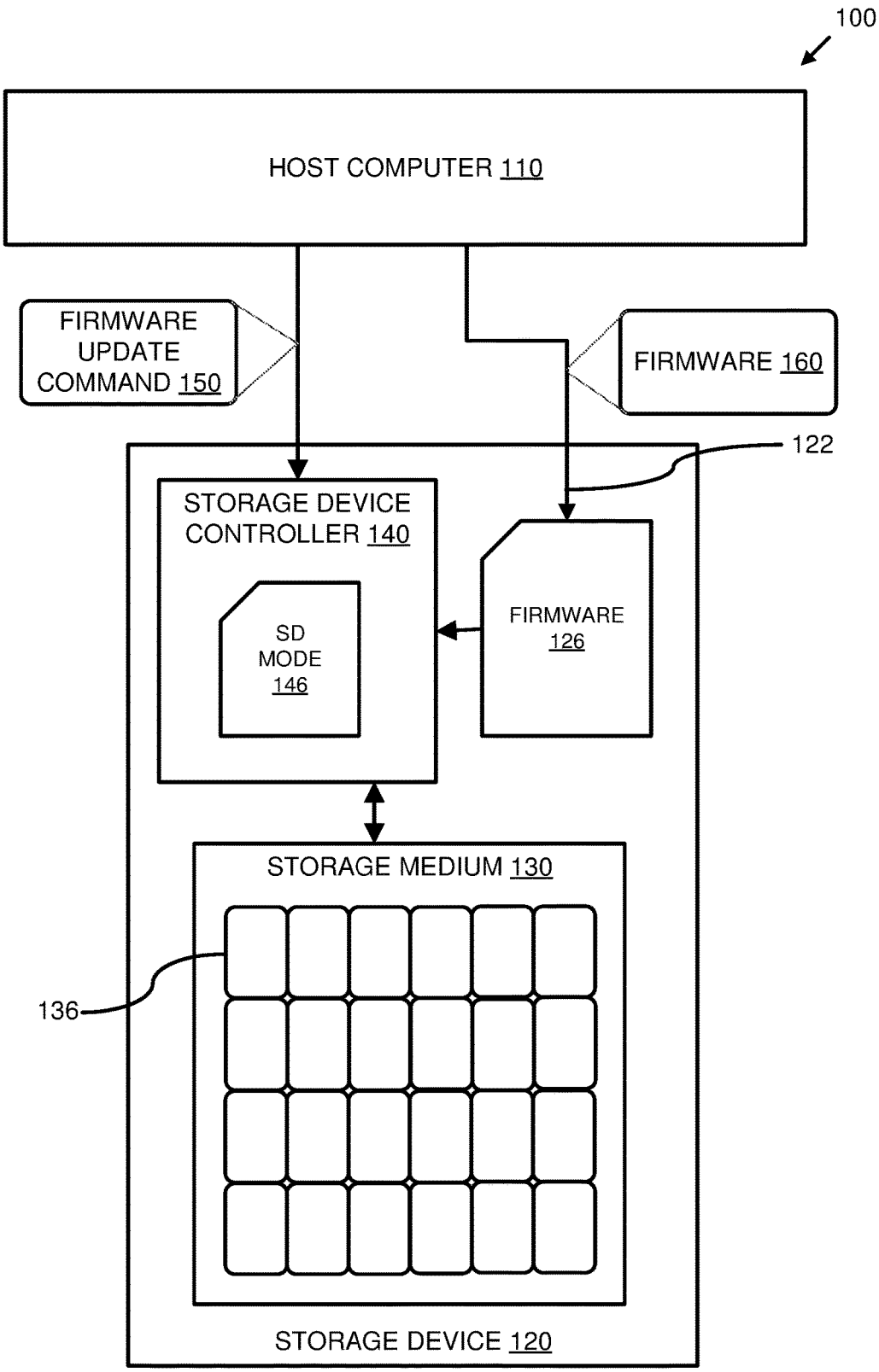
FIG. 1 is a system diagram depicting an example system configured to support direct access to a storage device firmware by a host computer.

Many electronic device manufacturers and suppliers provide their devices with pre-installed firmware. In some scenarios, such as when an electronic device (such as a computing device, a storage device, etc.) is going to be used in a secure environment, it may make sense to replace the pre-installed firmware with a firmware that is known to be secure. It may not be sufficient to query the device to determine if the pre-installed firmware is a trusted firmware. For example, a malicious firmware may be programmed to identify itself as a trusted firmware when, in fact, it is not. In at least some previous devices, firmware installation is managed by a device controller configured to receive a firmware update command and to manage the installation of a new firmware on the device.

However, in at least some cases, the pre-installed firmware of the device can comprise instructions that are used by the device controller to perform the firmware installation. In situations where the pre-installed firmware provided with the device cannot be trusted, it is possible that the firmware installation will not be performed correctly. For example, a malicious firmware may be programmed to process a firmware installation command by ignoring a provided firmware, but also report that the provided firmware has in fact been installed.

At least some of the embodiments of the technologies described herein address this problem by enabling a device firmware update mode that bypasses control logic of a device and allows a host computer to write a firmware directly to the device. Thus, in at least some scenarios, a host computer can ensure that a provided firmware is actually installed on the device, and that the installed firmware is a firmware that the host computer trusts.

For example, a device can be configured to receive a command from a host computer connected to the device to enter a firmware update mode of operation. In the firmware update mode, a communication channel within the device can be enabled that allows the host computer to bypass control logic that is driven by the device's current firmware, and to access an onboard memory or storage medium where the device's firmware is stored. The host computer can then overwrite the device's current firmware with a different firmware that the host computer trusts. The trusted firmware can be subsequently used by the device to process data access commands received from the host computer.

In at least some embodiments, the device can be configured to determine that the command to place the device in the firmware update mode is authorized before enabling the bypass communication channel. Additionally or alternatively, the device can be configured to only accept the command to place the device in the firmware update mode during an initialization of the device. For example, a firmware or driver of the host computer can be configured to transmit the firmware update mode command as an initial communication to the device after restarting the device.

In a different or further embodiment, the host computer can be configured to detect an initial connection of the device to the host computer. The host computer can be configured to place the device in the firmware update mode, and to install the trusted firmware on the device via the bypass communication channel, before allowing the device to be used for data access operations.

Although some of the examples described herein refer to storage devices, the technologies described herein can be applied to other types of electronic devices as well. For example, a computing device that contains an embedded firmware (such as a switch, router, microcontroller, graphical processing unit (GPU), peripheral device, user interface device, etc.) can have its firmware updated using at least some of the techniques described herein. Although the term firmware is used herein, the technologies described herein can be used to securely update other types of embedded devices software as well.

FIG. 1 is a system diagram depicting an example system 100 configured to support direct access to a storage device firmware 126 by a host computer 110.

The example system 100 comprises a storage device 120 connected to a host computer 110. The storage device 120 comprises a storage device controller 140 and a storage medium 130. The storage medium 130 can comprise multiple storage locations 136 (e.g., data blocks or the like) where data can be stored. The storage device controller 140 can be configured to perform data access operations to store data to, and retrieve data from, one or more storage locations of the storage medium 130.

The storage device 120 can comprise a firmware 126. The firmware 126 can be used by the storage device controller 140 to perform control logic (such as data access operations, storage device maintenance operations, etc.). In at least some embodiments, all or part of the firmware 126 can be stored in one or more of the storage locations of the storage medium 130. Additionally or alternatively, all or part of the firmware 126 can be stored in an onboard memory (not shown) of the storage device 120 (such as an electrically erasable programmable read-only memory (EEPROM), etc.).

The storage device controller 140 can be configured to receive a firmware update command 150 from the host computer 110 and to enable a communication channel 122 of the storage device 120 by which the host computer 110 can directly access the firmware 126. The host computer 110 can be configured to use the communication channel 122 to overwrite the firmware 126 of the storage device 120 with another firmware 160. In at least some embodiments, the communication channel 122 can be a communication channel that bypasses the storage device controller 140. For example, the storage device controller 140 can comprise a command processor configured to receive commands (such as data access commands, firmware update commands (e.g., 150), etc.) from the host computer 110. The communication channel 122 can be configured to bypass such a command processor, thus enabling the host computer 110 to write the firmware 160 directly to the storage device 120 without necessitating any assistance from the command processor.

In an embodiment where the firmware 126 is stored at a storage location in the storage medium 130, the communication channel 122 can enable the host computer 110 to write the firmware 160 to the storage location where the firmware 126 is stored. In an embodiment where the firmware 126 is stored in an onboard memory of the storage device 120, the communication channel 122 can enable the host computer 110 to directly access the onboard memory. The storage device controller 140 can be configured to use the firmware 160 to perform storage device operations after the firmware 160 has been written to the storage device 120.

In at least some embodiments, the storage device controller 140 can be configured to authenticate the firmware update command 150 before enabling the communication channel 122. Authenticating the firmware update command 150 can comprise determining that the firmware update command 150 is received during a boot sequence of the storage device 120. For example, the host computer 110 can be configured to transmit one or more commands to the storage device controller 140 to restart the storage device 120. Additionally or alternatively, the one or more commands can be commands to perform a hard reset of the storage device 120. During a subsequent boot sequence of the storage device 120, the host computer 110 can transmit the firmware update command 150 to the storage device controller 140. The storage device controller 140 can be configured to boot the storage device into a firmware update mode. For example, the storage device controller 140 can be configured to update a storage device mode 146 to a value that indicates that the storage device 120 is in a firmware update mode. In such an embodiment, the storage device controller 140 can be configured to reject a firmware update command that is received outside of a boot sequence of the storage device 120.

In a different or further embodiment, authenticating the firmware update command 150 can comprise a security challenge in which the storage device controller 140 determines whether the host computer 110 is authorized to perform a direct firmware update on the storage device 120. For example, the firmware update command 150 can comprise a digital signature that the storage device controller 140 can be configured to verify using a security certificate (not shown).

In at least some embodiments, the host computer 110 can be configured to perform the firmware update in response to detecting an initial connection of the storage device 120 to the host computer 110. For example, when the host computer 110 detects that the storage device 120 is connected to the host computer 110 for a first time the host computer 110 can transmit the firmware update command 150 to the storage device controller 140, and subsequently write the firmware 160 to the storage device 120 via the enables communication channel 122. Alternatively, the host computer 110 can be configured to perform the firmware update during an initial provisioning of the storage device 120. For example, when the storage device 120 is provisioned for a first time, the host computer 110 can be configured to perform the firmware update before formatting the storage medium 130 and making the storage device 120 available for access by applications.

In any of the examples described herein, a storage device can be a device capable of storing data in one or more physical storage media. For example, the storage device can be a magnetic storage device, such as a hard disk drive, that is capable of storing data in one or more magnetic recording formats. Other examples of storage devices include flash storage devices (such as NAND-type flash devices and NOR-type flash devices), and random access data storage devices (such as DRAM devices). Further examples of storage devices include non-volatile dual in-line memory modules (NVDIMMs).

In some embodiments, the storage device comprises multiple disparate storage media. For example, the storage device can be a hard disk drive that comprises one or more magnetic disks and an internal memory. In another example, the storage device comprises solid state storage and magnetic storage. In another example the storage device comprises multiple magnetic disks organized as a Redundant Array of Independent Disks (RAID). Other combinations of disparate storage media are also possible.

In any of the examples described herein, a device controller can comprise one or more hardware components of an electronic device. The storage device controller can be configured to access a firmware stored in a read-only memory (ROM) of the device, a storage medium of the device, or some combination thereof. Additionally or alternatively, the device controller can be implemented at an intermediate layer between an application and the device. Such an intermediate layer controller can comprise software (such as a driver) and one or more processors, a system-on-chip (SoC), a field-programmable gate array (FPGA), and/or an application-specific integrated circuit (ASIC). In some embodiments, the device controller can be part of an application. In such an embodiment, the application may use the device controller to access a device directly, without using an intermediate layer, such as a driver. The device controller can be located on a computer containing the device, or on a separate computer that is connected to the device via a communication channel, such as a computer network.

In any of the examples described herein, a data block (or block of data) can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device and a logical address, such as a logical block address (LBA), which is used by external components to identify and access the data block. By using logical addresses, the physical storage locations of data blocks in the storage device can change without having to notify or update any external components.

In any of the examples described herein, a host computer can be a server or other computing device that comprises a processor and is connected to an electronic device. The host computer is connected to the device and configured to transmit commands, such as processing commands, communication commands, data access commands (i.e., commands to perform data read and write operations), inquiry commands, firmware update commands, or the like, to the device. The host computer can be configured to receive command responses from the device. The connection can be a direct connection, such as a cable or bus connection, an indirect connection, such as a connection over a network, or some combination thereof. In scenarios where the host computer is connected to more than one device, the various connections can be of the same type or different types.

In some embodiments, the host computer can comprise a controller connected to multiple devices. In at least some embodiments, the host computer can be a computing device configured to provide a unified access point for multiple connected storage devices, such as a JBOD ("just a bunch of drives/disks") device, a RAID array controller, etc.

In any of the examples described herein, a firmware can comprise one or more software components that provide control and/or monitoring of one or more components of an electronic device. In at least some embodiments, the firmware comprises executable instructions stored in a non-volatile storage location (such as a non-volatile random access memory (NVRAM), an electronically erasable programmable read-only memory (EEPROM), a persistent storage medium, or the like). The firmware can be accessed by a device controller during a boot process of the device. Additionally or alternatively, the firmware can be accessed in response to one or more commands transmitted to the device from a connected computing device (such as a host computer).

Figure 2:
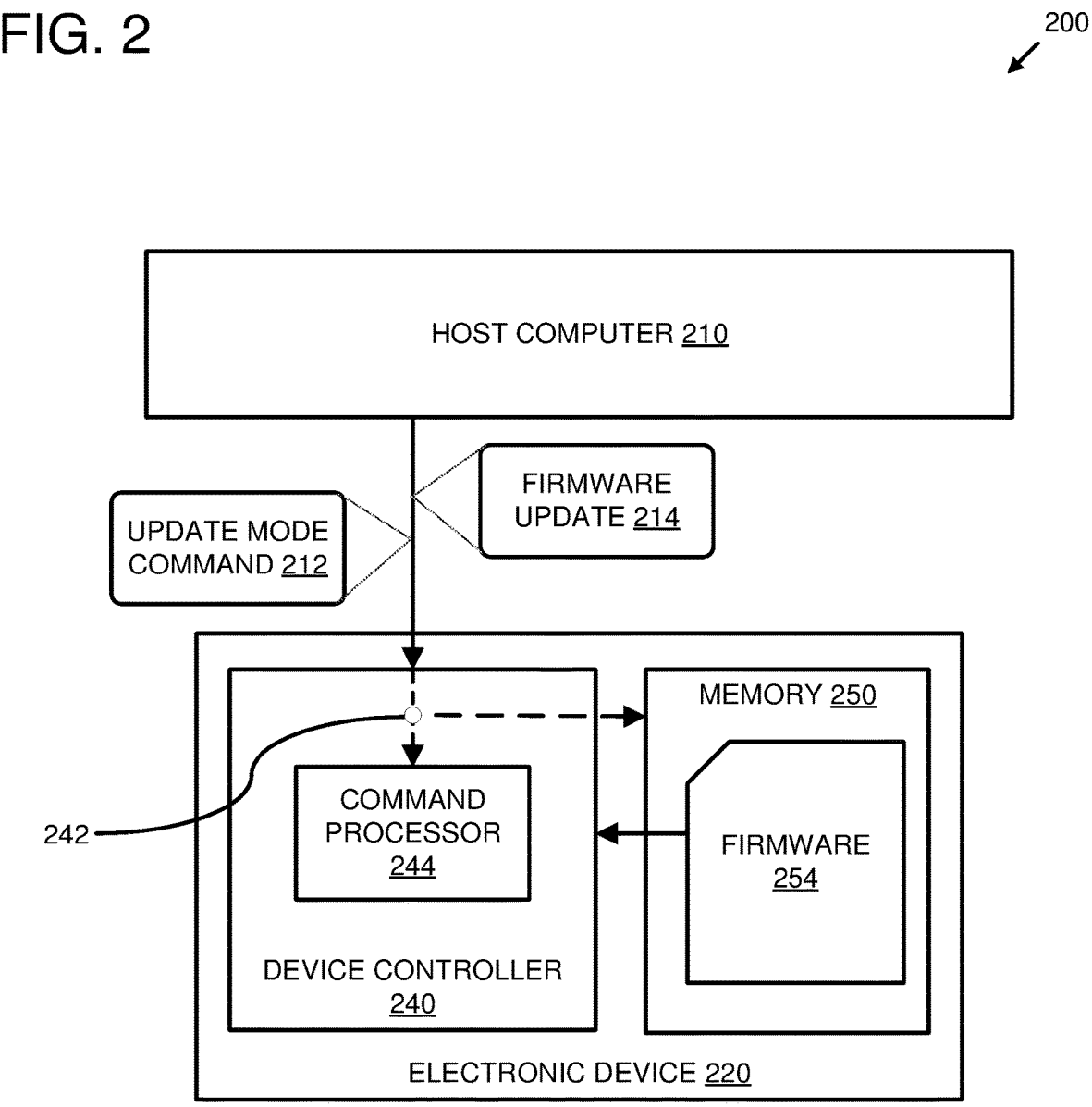
FIG. 2 is a system diagram depicting an example system comprising an electronic device configured to support a host computer I/O bypass.

FIG. 2 is a system diagram depicting an example system 200 comprising an electronic device 220 configured to support a host computer I/O bypass 242. The electronic device 220 comprises a device controller 240, and an onboard memory 250. The onboard memory 250 can comprise a firmware 254. The firmware 254 can comprise instructions that, when loaded and executed by the device controller 240, configured the device controller 240 to perform one or more device-related operations. For example, the device controller 240 can comprise a command processor 244 configured to use the firmware 254 to process commands received from the host computer 210.

The device controller 240 can be configured to receive an update mode command 212 from the host computer 210 via a connection between the device 220 and the host computer 210. The device controller 240 can be configured to enable a direct communication channel between the host computer 210 and the onboard memory 250 storing the firmware 254. (Although an onboard memory 250 is depicted as storing the firmware 254 in FIG. 2, in at least some embodiments all or part of the firmware 254 can be stored in a different storage, such as a storage medium, etc.). The host computer 210 is configured to transmit the update mode command 212 to the device controller 240, and to overwrite the firmware 254 with a firmware update 214 via the direct communication channel.

In at least some embodiments, enabling the direct communication channel comprises enabling a connection between the onboard memory 250 and one or more communication pins of a data port (not shown) of the host computer 210 to which the device 220 is connected. For example, enabling the direct communication channel can comprise setting an input/output (I/O) bypass 242 within the electronic device 220 to establish a connection between one or more communication pins of the device 220, to which the host computer 210 data port is connected, and a storage location (e.g., the memory 250) of the firmware 254 in the electronic device 220.

The I/O bypass 242 can comprise one or more integrated circuits of the device 220. During normal operation, the I/O bypass 242 can be deactivated, thereby allowing commands (such as the update mode command 212) to be transmitted from the host computer 210 to the command processor 244. Once the I/O bypass 242 is activated, the host computer 210 can bypass the command processor 244 (and/or other components of the device controller 240) and write the firmware update 214 to the memory 250. In at least some embodiments, the device 220 comprises one or more memory controller circuits (not shown) that are configured to retrieve data from, and write data to, the memory 250. In such an embodiment, the device controller 240 can be configured to interface with the memory controller circuits to access the firmware 254 in the memory 250. When the I/O bypass 242 is activated, the host computer 210 can write the firmware update 214 to the memory 250 via the same (or a separate) interface with the memory controller circuit(s). In at least one embodiment, the host computer 210's access to the memory 250 via the I/O bypass 242 is restricted to a region of the memory 250 in which the firmware 254 is stored.

In at least some embodiments, the device controller 240 is configured to determine whether the update mode command 212 is valid before enabling the direct communication channel between the host computer and the onboard memory 250 storing the firmware 254. For example, the device controller 240 can be configured to process the update mode command 212 and activate the I/O bypass 242 only during an initialization (or boot) sequence of the electronic device 220. Once the device 220 has been initialized into a normal operating mode, the device controller 240 can be configured to reject any commands to place the device 220 in the firmware update mode.

In at least some embodiments, the host computer 210 can be configured to sign all or part of the update mode command 212 with a cryptographic secret key and to transmit the signature to the device controller 240 with the update mode command 212. The device controller 240 can be configured to validate the update mode command 212 using the signature and a cryptographic public key stored on the device 220. For example, the cryptographic public and private keys can be generated as a key pair, the private key can be stored securely on the host computer 210 (or in a secure location to which the host computer has access), and the public key can be stored on the device 220 during an initial configuration of the device 220. This example is provided for illustration. Other validation techniques are also possible.

Figure 3:
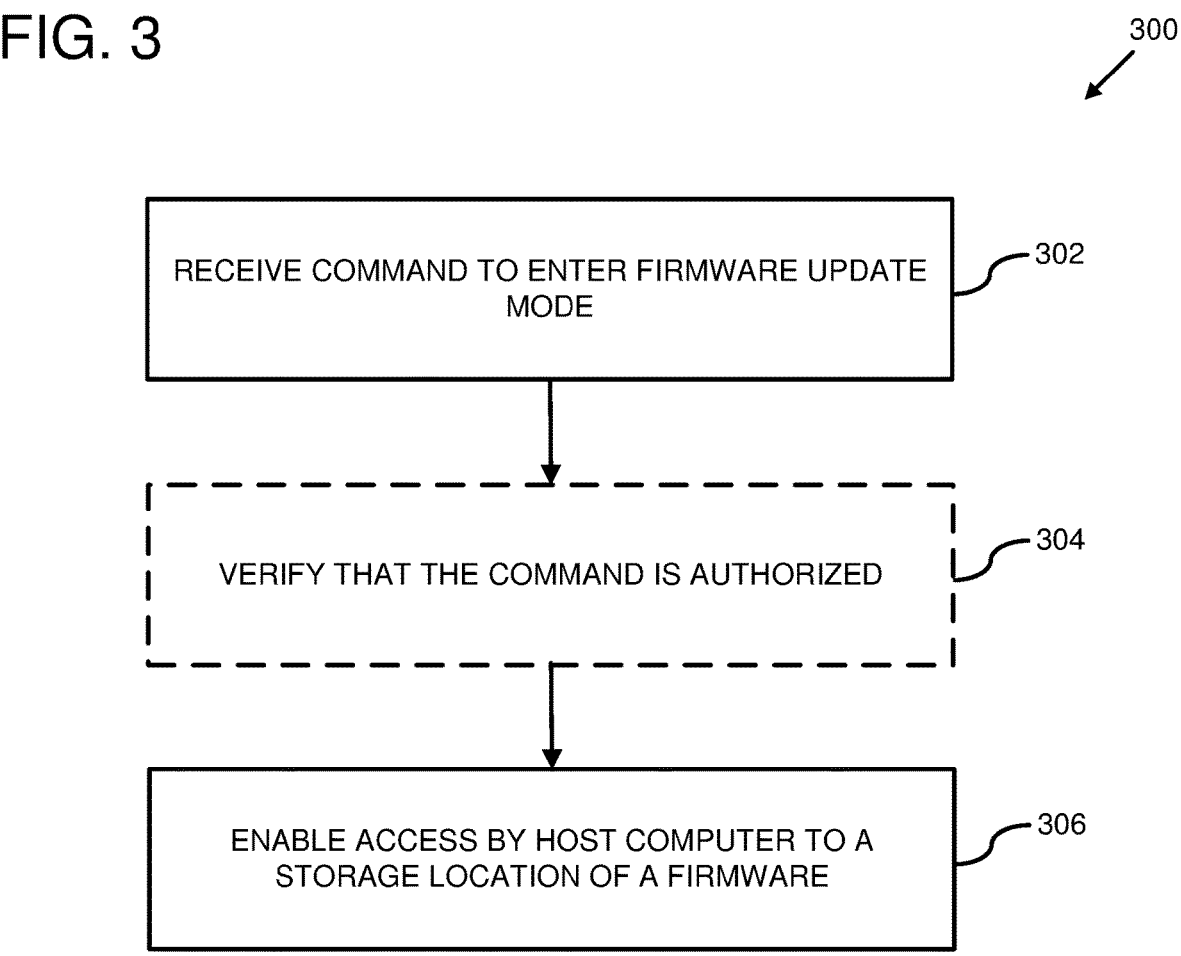
FIG. 3 is a flowchart of an example method for enabling access to a firmware storage location by a host computer.

FIG. 3 is a flowchart of an example method 300 for enabling access to an electronic device firmware storage location by a host computer. Any of the example systems described herein can be used to perform the example method 300.

At 302, a command is received at an electronic device (such as a computing device, a storage device, etc.) to enter a firmware update mode. The command can be received from the host computer via a wired (or wireless) connection to the device. For example, the device can be connected to a communication bus port of the host computer (such as a serial data bus port, a parallel data bus port, etc.). In at least some embodiments, the host computer can transmit the command to enter the firmware update mode to the device in response to detecting a first connection of the device to the communication bus port.

For example, the host computer can retrieve a device identifier (such as a serial number, a model number, or the like) from the device via the communication bus port, and check the device identifier against a list of identifiers for devices on which a trusted firmware has been installed. If the retrieved device identifier is not in the list, then the host computer can transmit the command to the device to enter the firmware update mode.

Optionally, at 304, it is verified that the command to enter the firmware update mode is authorized. In at least one embodiment, verifying that the command to enter the firmware mode is authorized comprises validating a security token provided by the host computer with a key stored on the device. Additionally or alternatively, verifying that the command is authorized can comprise receiving the security token from the host computer and verifying the security token using a digital certificate stored on the device. The security key can be transmitted to the device as part of the command to enter the firmware update mode, or as part of a separate communication.

In at least some embodiments, the command to enter the firmware update mode can only be processed during an initialization sequence of the device. In such an embodiment, verifying that the command to enter the firmware update mode is authorized can comprise verifying that the command is received from the host computer during an initialization of the device. In at least one embodiment, the command to enter the firmware update mode must be received as a first communication from the host computer during the initialization of the device.

In a different or further embodiment, the host computer can comprise one or more hardware components (such as an ASIC, FPGA, SoC, or the like) configured to transmit the command to enter the firmware update mode to the device. In such an embodiment, a security key can be embedded in a storage that is accessible by the one or more hardware components. The key can be retrieved and used by the one or more hardware components to generate a signature for the command to enter the firmware update mode. In at least some such embodiments, the key is not accessible by other hardware and/or software components of the host computer. In a particular embodiment, the one or more hardware components are embedded on a PCI express (PCI-E) card connected to a PCI-E port of the host computer.

At 306, access is enabled to a storage location in the device where a firmware can be stored by a connected host computer. Enabling the access to the storage location of the firmware can comprise enabling a communication channel that bypasses control logic of the device and allows the host computer to access a storage (such as a storage medium, a ROM, etc.) where the firmware is stored. For example, during normal operation (i.e. when a communication channel is disabled) communication from the host computer can be routed to the control logic of the device. The control logic of the device can thus act as an intermediary: processing commands received from the host computer and retrieving data from and/or writing data to one or more storages of the device (such as the storage where the firmware stored). During the firmware update mode (i.e., when the communication channel is enabled), the host computer can bypass the control logic and directly read data from and/or write data to the storage location where the firmware can be stored.

In at least some embodiments, the host computer's access can be restricted to the storage location where a firmware for the device can be stored. In such embodiments, attempts to write data to and/or read data from other storage locations of the device can be rejected.

Figure 4:
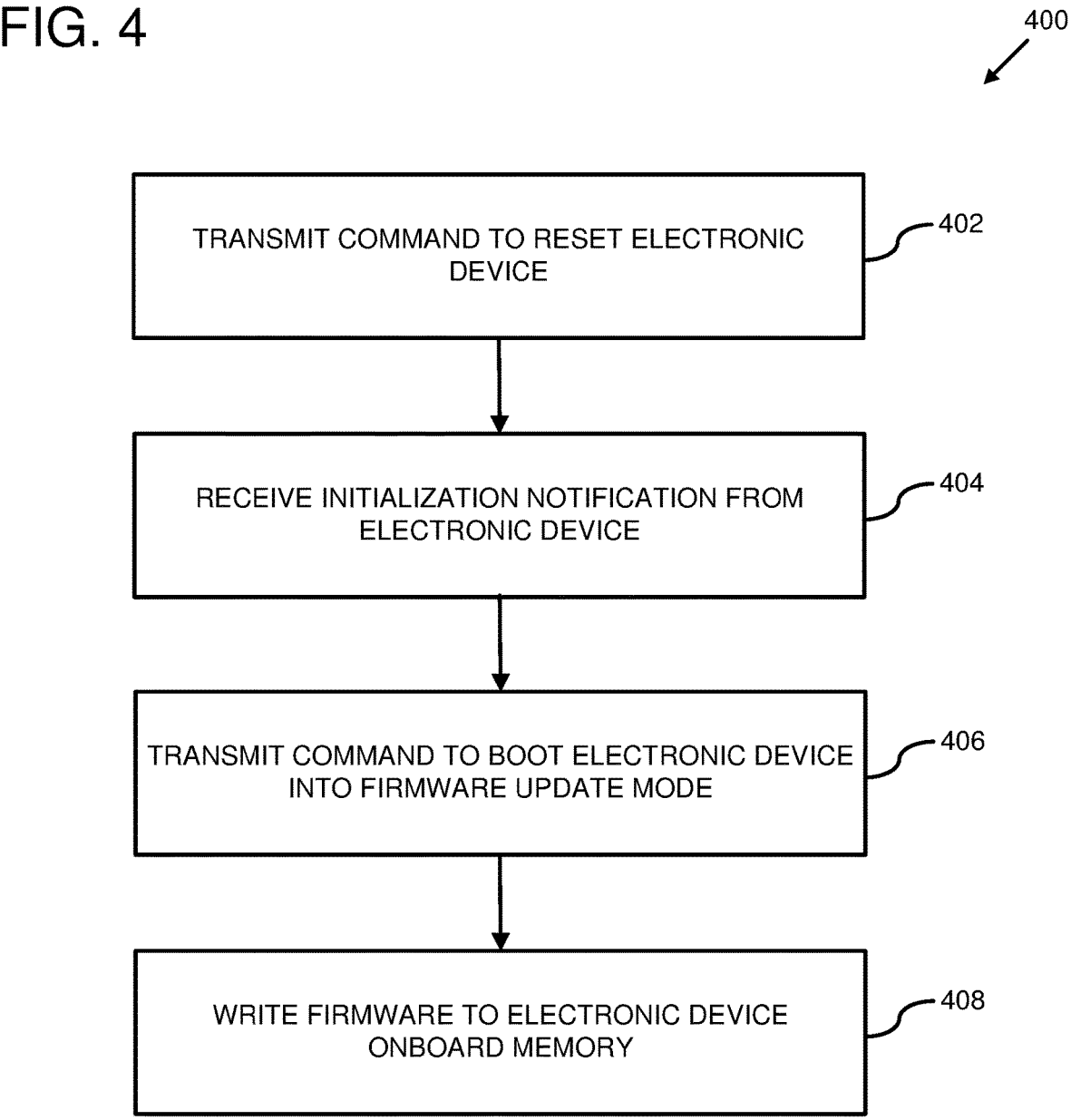
FIG. 4 is flowchart of an example method for updating an electronic device firmware.

FIG. 4 is flowchart of an example method 400 for updating an electronic device firmware. Any of the example systems described herein can be used to perform the example method 400.

At 402, a command is transmitted by a host computer to reset an electronic device. In at least some embodiments, the device is connected to a communication bus of the host computer (such as a serial communication bus, a parallel communication bus, etc.). In such an embodiment, the host computer can transmit the command to a communication bus port, to which the device is connected, via the communication bus.

At 404, an initialization notification is received from the device. The initialization notification can indicate that the device has been reset and is beginning an initialization sequence to prepare the device for operation. In a particular embodiment, the initialization notification comprises an interrupt signal transmitted by the device via a communication bus of the host computer to which the device is connected.

At 406, a command is transmitted by the host computer to boot the device into a firmware update mode. Responsive to receipt of the initialization notification from the device, the host computer can transmit the command to boot the device in the firmware update mode during the initialization sequence of the device. In at least some embodiments, the device can be configured to enter the firmware update mode only during the device's initialization sequence. In a different or further embodiment, the device can be configured to accept the command to enter the firmware update mode only as part of a first communication after the device has been reset. In such an embodiment, it may be possible to ensure that only a firmware, driver, or hardware component of the host computer that issues a first communication to the device during its initialization is able to place the device in the firmware update mode.

At 408, a firmware is written to an onboard memory of the device by the host computer. Once the device has been booted into the firmware update mode, the host computer can bypass control logic of the device and gain low-level access to the onboard memory where a firmware of the device can be stored. In an embodiment where the device is connected to a communication bus of the host computer, one or more channels of the communication bus connection can be diverted to make a connection with a low-level memory controller of the device. The host computer can transmit a trusted firmware via the one or more diverted communication channels to the low-level memory controller in order to overwrite a firmware stored on the device with the trusted firmware.

In at least some embodiments, the device can reject commands to perform device operations (such a data access operations, computation operations, communication operations, etc.) while operating in the firmware update mode. Once the firmware has been written to the device onboard memory, the host computer can transmit another reset command to the device. The device can use the new firmware now stored in the onboard memory to initialize the device and to perform device operations.

Figure 5:
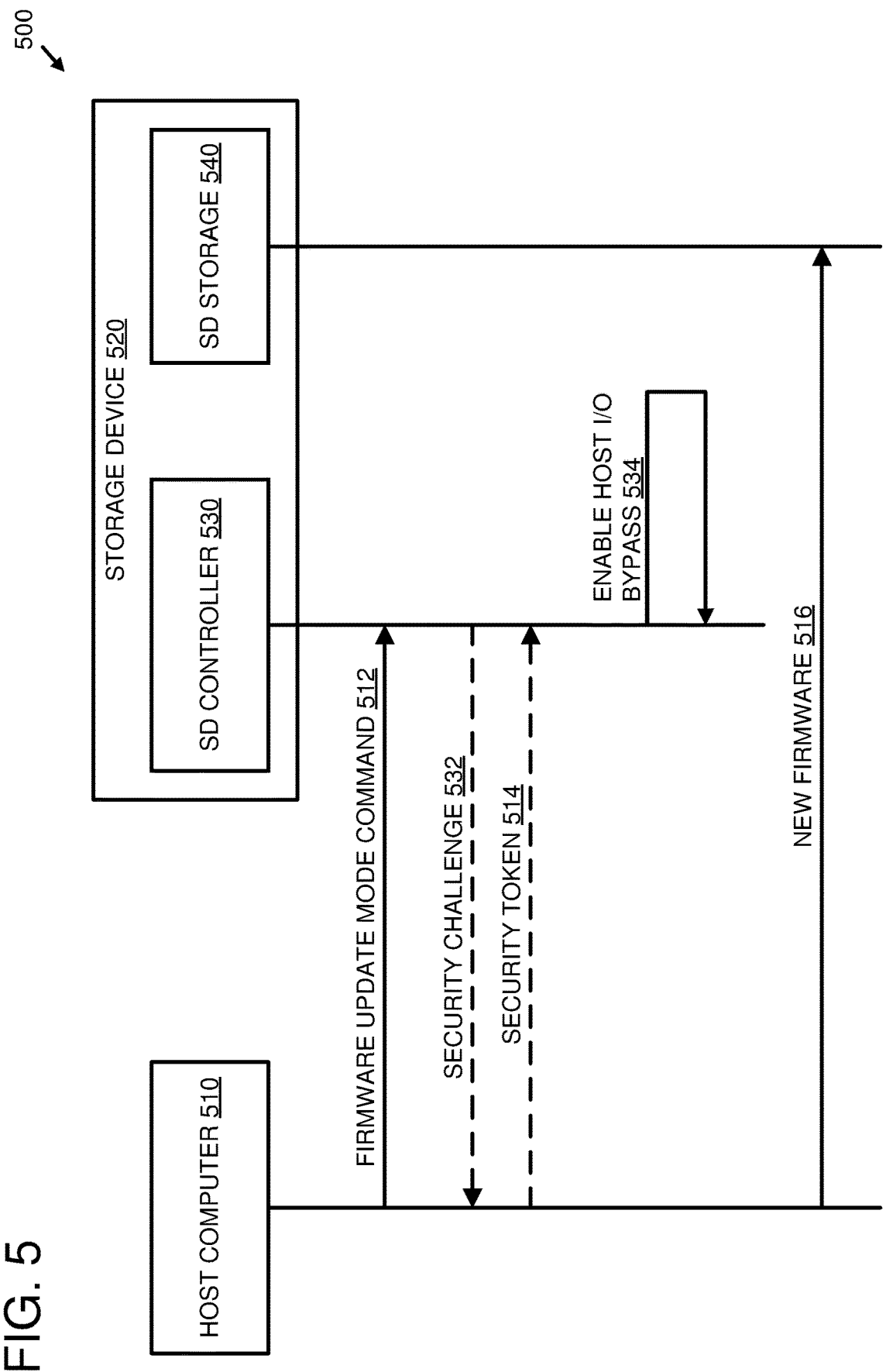
FIG. 5 is a sequence diagram of an example system configured to perform a direct storage device firmware installation by a host computer.

FIG. 5 is a sequence diagram of an example system 500 configured to perform a direct storage device firmware installation by a host computer 510. The example system 500 comprises the host computer 510 and a storage device 520. The storage device 520 comprises a storage device controller 530 and a storage 540. The storage 540 can comprise one or more storage media (such as a magnetic disk, solid state storage, one or more non-volatile memories (such as an EEPROM), or the like).

The host computer 510 is configured to transmit a firmware update mode command 512 to the storage device controller 530. The host computer 510 can be connected to the storage device controller 530 via a wired connection, a wireless connection, or some combination thereof. In at least one embodiment, the storage device controller 530 is connected to a data bus of the host computer 510.

Optionally, the storage device controller 530 can be configured to verify that the command 512 is transmitted by an authorized agent. Verifying that the command 512 is transmitted by an authorized agent can comprise transmitting a security challenge 532 to the host computer 510. The security challenge 532 can comprise a request for a security token from the host computer 510. For example, the security challenge 532 can comprise a request that the host computer 510 provide a token, such as a digital signature, with which the host computer's identity can be authenticated.

The host computer 510 can be configured to provide the security token 514 in response to receiving the security challenge 532. Alternatively, the host computer 510 can be configured to transmit the security token 514 along with the command 512. In such an embodiment, the security token 514 can comprise a signature of the update mode command 512. In at least some embodiments, the host computer 510 comprises a hardware component (such as a SoC, FPGA, ASIC, or the like) configured to generate the security token 514 and transmit the security token 514 to the storage device controller 530.

The storage device controller 530 can be configured to enable a host I/O bypass 534. In an embodiment where the host computer transmits the security token 514 to the storage device controller 530, the controller 530 can be configured to verify the identity of the host computer 510 using the security token 514. If the host computer 510 is authorized to place the storage device 520 in the firmware update mode, then the storage device controller 530 can enable the host I/O bypass 534. If the host computer 510 is not authorized to place the storage device 520 in the firmware update mode, then the storage device controller 530 can reject the command 512 and leave the host I/O bypass 534 disabled.

The host I/O bypass 534 can enable the host computer 510 to bypass the storage device controller 530 and access the storage 540 with input and/or output operations directly. The host computer 510 can be configured to write a new firmware 516 to the storage 540. In at least some embodiments, the host I/O bypass 534 can be restricted to a storage location in the storage 540 where a firmware for the storage device 520 is stored. For example, the storage device controller 530 can be configured to load a firmware from a particular storage location of the storage 540 during a boot sequence of the storage device. The host I/O bypass 534 can enable the host computer 510 to write the new firmware 516 to such a storage location. During a subsequent boot sequence, the storage device controller 530 can load the new firmware 516 from the storage location of the storage 540.

Figure 6:
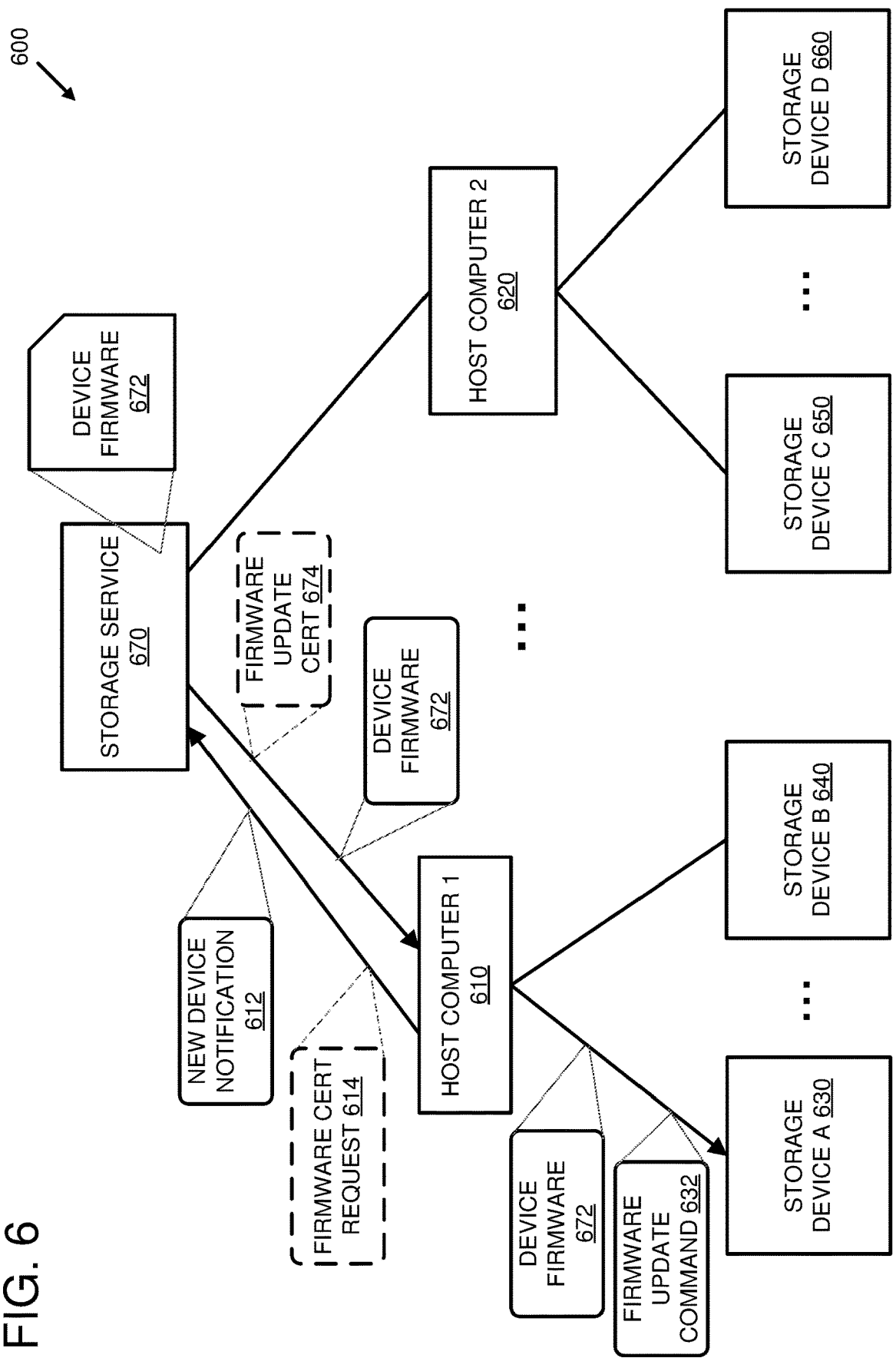
FIG. 6 is a system diagram depicting an example system configured to update a storage device firmware using a storage service.

FIG. 6 is a system diagram depicting an example system 600 configured to update a storage device firmware using a storage service 670. The example system 600 comprises multiple storage devices 630-660 connected to multiple host computers 610-620. Multiple storage devices can be connected to a given host computer. For example, storage devices 630-640 are connected to the host computer 610 and the storage devices 650-660 are connected to the host computer 620. The connections between the storage devices 630-660 and the host computers 610-620 can comprise communication bus connections. For example, the storage devices 630-640 can be connected to data ports of a communication bus of the host computer 610. The host computers 610-620 can be configured to transmit data access commands (not shown) to the storage devices to which they are connected. The storage devices 630-660 can be configured to receive such data access commands from the host computers to which they are connected and to process the commands by accessing storage media contained within the storage devices.

The host computers 610-620 can be connected to a storage service 670. The connections between the host computers 610-620 and the storage service 670 can comprise wired connections, wireless connections, or some combination thereof. In at least some embodiments, the storage service 670 is configured to receive data access requests (not shown) and to process the data access requests by identifying one or more of the storage devices 630-660 storing the requested data (and/or that are capable of storing data accompanying the data access requests) and transmitting the requests to one or more of the host computers 610-660 to which the identified storage devices are connected. In at least some embodiments, the storage devices 630-660, the host computers 610-620, and the storage service 670 can be configured to act as a distributed data storage system.

The host computers 610-620 can be configured to detect an initial connection of a storage device and to perform provisioning operations to prepare a connected storage device for use for data storage and retrieval. The provisioning operations can comprise placing the connected storage device in a firmware update mode and installing a trusted storage device firmware on the connected storage device. Placing the connected storage device in the firmware update mode can comprise enabling a communication channel within the storage device that allows the host computer to bypass control logic of the connected storage device and to write the firmware to a storage location in a storage medium of the connected storage device. In at least some embodiments, the trusted storage device firmware can be retrieved by the host computer from the storage service 670.

FIG. 6 depicts an example scenario in which the host computer 610 installs a trusted device firmware 672 on the storage device 630. During a provisioning of the storage device 630, the host computer 610 can transmit a new device notification 612 to the storage service 670. The new device notification 612 can indicate that the host computer 610 has detected a connection to the storage device 630 and is performing a provisioning of the storage device 630. In at least some embodiments the new device notification 612 can comprise identifying information about the storage device 630 (such as a model number of the storage device 630, a serial number of the storage device 630, etc.).

Upon receipt of the new device notification 612, the storage service 670 can retrieve the device firmware 672 and transmit it to the host computer 610. In embodiments where the new device notification 612 comprises identifying information about the storage device 630, the storage service 670 can be configured to use the identifying information to locate a firmware that is compatible with the storage device 630. For example, the storage devices 630-660 can comprise storage devices of various makes and models. In such an embodiment, the storage service 670 can be configured to store various storage device firmwares that are compatible with the various different storage devices.

The host computer 610 can be configured to transmit a firmware update command 632 to the storage device 630 to place the storage device 630 in the firmware update mode. In at least some embodiments, the storage device 630 can be configured to authenticate the firmware update command 632 before switching to the firmware update mode. Switching to the firmware update mode can comprise enabling a communication channel to allow the host computer 610 to install the firmware 672 to a storage location of the storage device 630. In at least some such embodiments, the storage device 630 is configured to determine whether the firmware update command 630 is signed with a given digital certificate. Such a certificate (or a public key associated with the certificate) can be installed on the storage device 630 by storage device manufacturer or vendor. For example, the certificate (or key associated with the certificate) can be provided to a storage device manufacturer or vendor. The certificate (or key) can be "stamped" (i.e., written to a read-only storage) into storage devices provided by the manufacturer or vendor. The storage device 630 can be configured to validate the firmware update command 632 using such a certificate (or key).

Optionally, the host computer 610 can be configured to transmit the firmware certificate request 614 to the storage service 670. In response, the storage service 670 can be configured to transmit the certificate 674 to the host computer 610. The host computer 610 can then sign the firmware update command 632 using the certificate 674 before transmitting the firmware update command 632 to the storage device 630. Alternatively, the host computer 610 can transmit the firmware update command 632 to the storage service 670. The storage service 670 can be configured to sign the firmware update command 632 and to transmit the signed firmware update command (not shown) back to the host computer 610.

Once the storage device 630 has enabled the communication channel, the host computer 610 can install the device firmware 672 in a storage medium of the storage device 630 using the enabled communication channel. Once the device firmware 672 has been written to the storage device 630, the host computer 610 can transmit a command to the storage device 630 to restart the storage device. Upon restarting, the storage device 630 can use the installed device firmware 672 to process data access commands received from the host computer 610.

Figure 7:
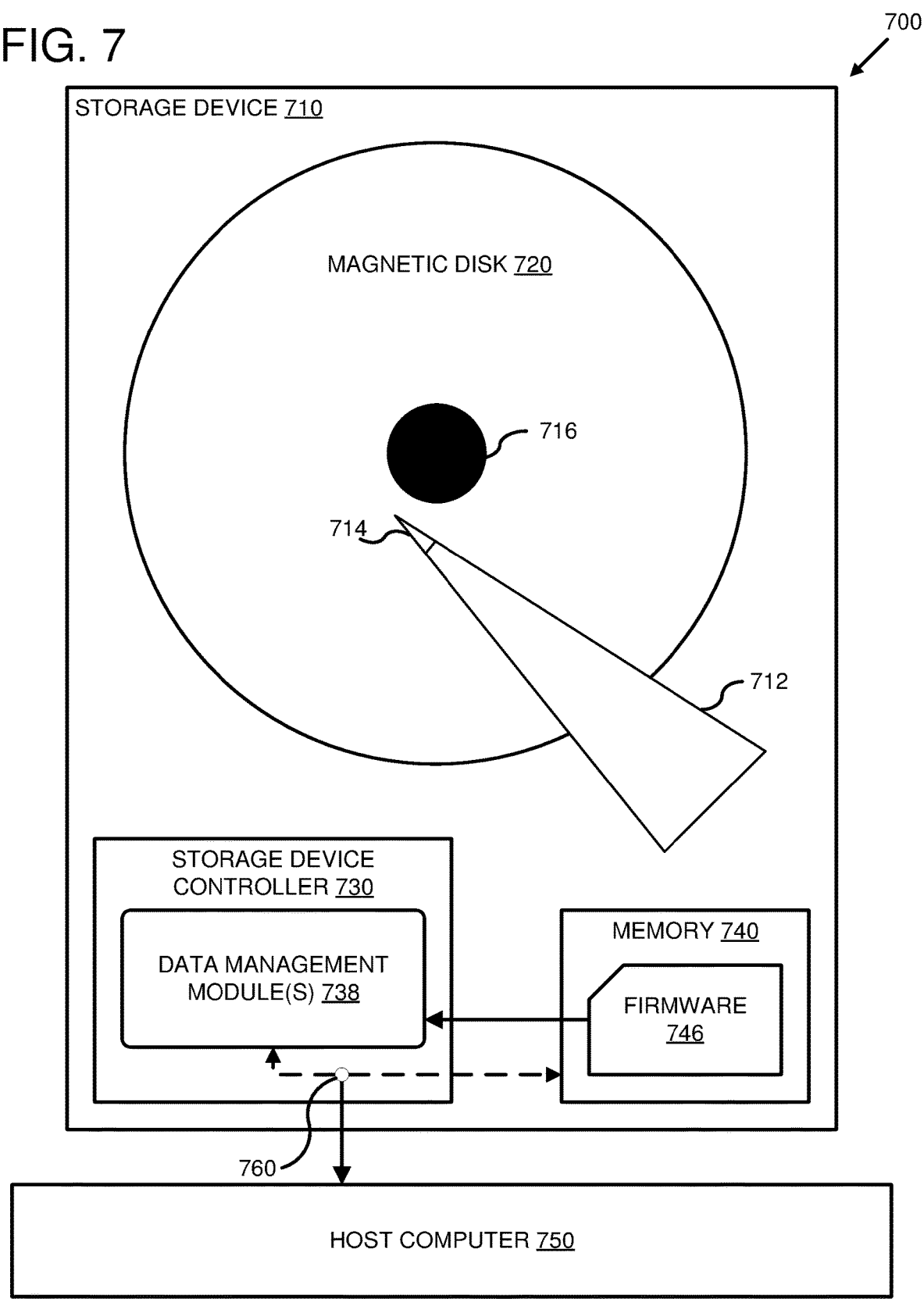
FIG. 7 is a system diagram depicting an example storage device configured to support firmware access by a host computer.

FIG. 7 is a system diagram depicting an example system 700 comprising a storage device 710 configured to support firmware access by a host computer 750. The storage device 710 comprises a magnetic disk 720, a storage device controller 730, and a memory 740. The memory 740 is configured to store a firmware 746. The memory 740 can be a non-volatile memory (such as an EEPROM or the like). The storage device controller 730 is configured to load one or more data management modules 738 from the firmware 746 that, when executed by the storage device controller 730, cause the storage device controller 730 to perform data access operations using the magnetic disk 720.

A storage device controller 730 is configured to rotate the magnetic disk 720 on a spindle 716 and to perform data read and write operations on the magnetic disk 720 via a moveable actuator arm 712 with a read/write head 714. The actuator arm 712 can be rotated on an actuator axis (not shown) by an actuator (not shown) to move the read/write head 714 over different portions of the magnetic disk 720. The storage device controller 730 is configured to write data to and to read data from the magnetic disk 720 using the read/write head 714. The read/write head 714 can comprise a single head that can perform both read and write operations. Alternatively, the read/write head 714 can comprise two separate heads for reading and writing, respectively. The storage device controller 730 can be configured to use the read/write head 714 to write data to the magnetic disk 720 in multiple concentric circular tracks as the magnetic disk is rotated on the spindle 716.

The host computer 730 can be configured to transmit commands to the storage device controller 730 (not shown) to perform data read and write operations on the magnetic disk 720. The storage device controller 730 can process the commands using the one or more data management modules 738. The host computer 730 can be configured to transmit a command (not shown) to the storage device controller 730 to place the storage device 710 in a firmware update mode. In at least some embodiments, the host computer 750 is configured to transmit a command to restart the storage device 710 and to transmit the command to place the storage device 710 in the firmware update mode during a subsequent initialization of the storage device 710.

Responsive to receiving the command to place the storage device 710 into the firmware update mode, a bypass circuit 760 can be activated. When the bypass circuit 760 is activated, the host computer 750 can write data to the memory 740 without transmitting commands to the storage device controller 730. For example, in an embodiment where the storage device 710 is connected to data bus of the host computer, one or more communication channels of the bus connection can be diverted by the bypass circuit 760 to an onboard memory controller connected to the memory 740.

Once the bypass circuit 760 is activated, the host computer can overwrite the firmware 746 with a different firmware. In at least some embodiments, the host computer 750's write access to the memory 740 is restricted to a portion of the memory 740 where the firmware 746 is stored. In at least one such embodiment, the host computer 750's write access is restricted to transmitting the other firmware as a data stream that is written to a same storage location in the memory 740 where the firmware 746 is stored. In a different or further embodiment, when the bypass circuit 760 is activated, the host computer 750 is prevented from transmitting commands to the storage device controller 730.

After writing the firmware to the memory 740, the host computer 750 can be configured to reset the storage device 710. For example, the host computer can perform a hard reset or a soft reset to reboot the storage device 710. During the restart of the storage device 710, the bypass circuit 760 can be deactivated. For example, during a hard reset of the storage device 710, when power to the storage device 710 is cycled, the temporary loss of power can deactivate the bypass circuit 760.

During an initialization of the storage device 710, one or more modules of the firmware written to the memory 740 by the host computer 750 can be retrieved by the storage device controller 730 and used by the storage device controller 730 to perform data access operations.

Figure 8:
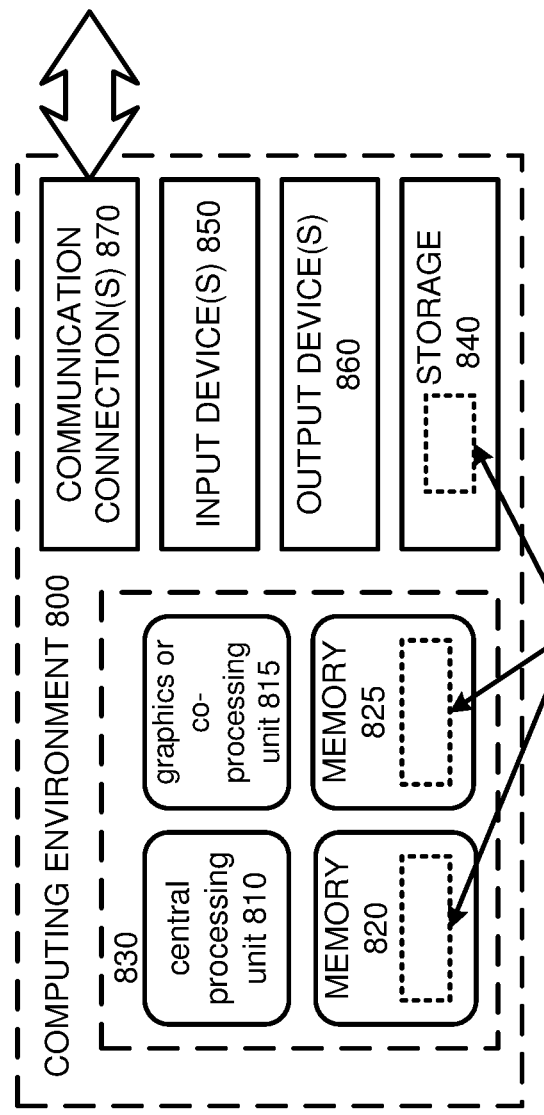
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

In at least some embodiments, the computing environment 800 can be a host computer or server as described herein.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

In some embodiments, the storage 840, input devices(s) 850, output device(s) 860, communication connection(s) 870, and/or the graphics or co-processing unit 815 comprise one or more of the example electronic devices as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.*The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system for storage device firmware installation, the system comprising:
   a storage device comprising a storage device controller, wherein the storage device controller is configured to:
      receive an update mode command from a host computer connected to the storage device,
      determine that the update mode command is valid, and
      in response to receiving the update mode command, enable a direct communication channel between the host computer and a storage location in the storage device where a firmware is stored, wherein the direct communication channel bypasses the storage device controller; and
   the host computer, wherein the host computer is configured to:
      transmit the update mode command to the storage device controller, and
      overwrite the firmware in the storage location in the storage device with another firmware via the direct communication channel bypassing the storage device controller.

2. The system of claim 1, wherein:
   the host computer is further configured to:
      transmit a command to reset the storage device,
      receive an initialization notification from the storage device, and
      transmit the update mode command responsive to receiving the initialization notification; and
   the determining that the update mode command is valid comprises determining that the update mode command is received during an initialization of the storage device.

3. The system of claim 1, wherein the determining that the update mode command is valid comprises:
   receiving a digital signature from the host computer; and
   verifying the digital signature using a digital certificate stored on the storage device.

4. The system of claim 1, wherein the host computer comprises an integrated circuit configured to:
   transmit the update mode command to the storage device controller, and
   overwrite the firmware with the another firmware via the direct communication channel.

5. The system of claim 1, wherein:
   the storage device further comprises an onboard memory comprising the storage location; and
   enabling the direct communication channel between the host computer and the storage location comprises enabling a communication channel between the host computer and the onboard memory of the storage device.

6. A system, comprising:
   an electronic device comprising a storage medium and a device controller, wherein the device controller is configured to:
      receive a firmware update command from a host computer; and
      in response to the firmware update command, enable a direct communication channel of the electronic device to bypass the device controller by which the host computer can directly access a firmware storage location in the storage medium bypassing the device controller.

7. The system of claim 6, wherein the device controller is further configured to:
   determine that the firmware update command is received during a boot sequence of the electronic device; and
   wherein the communication channel is enabled responsive to the determining that the firmware update command is received during the boot sequence.

8. The system of claim 6, wherein:
   the storage medium comprises an onboard memory comprising the firmware storage location; and
   the enabling the communication channel comprises enabling access by the host computer to the onboard memory.

9. The system of claim 8, wherein the onboard memory comprises an electronically erasable programmable read-only memory.

10. The system of claim 6, wherein the enabling the communication channel comprises enabling a connection between the firmware storage location and one or more communication pins of a data port of the electronic device to which the host computer is connected.

11. The system of claim 10, the electronic device further comprising a bypass circuit configured to enable the connection between the firmware storage location and the one or more communication pins.

12. The system of claim 6, further comprising the host computer, wherein the host computer is configured to:
   transmit the firmware update command to the device controller; and
   overwrite a firmware stored in the firmware storage location in the storage medium with another firmware via the communication channel.

13. The system of claim 12, wherein the host computer is further configured to:
   detect an initial connection of the electronic device to the host computer; and
   transmit the firmware update command to the device controller responsive to the detection of the initial connection.

14. The system of claim 12, wherein the host computer is further configured to retrieve the another firmware from a storage service via a computer network connection.

15. A method, comprising:
   receiving a command at a device controller of an electronic device to enter a firmware update mode from a connected host computer;
   authenticating the command to enter the firmware update mode; and in response to receiving the command, enabling direct access to a storage location in the electronic device where a firmware can be stored by the connected host computer, wherein the enabling comprises enabling a direct communication channel between the connected host computer and the storage location in the electronic device, wherein the direct communication channel bypasses the device controller.

16. The method of claim 15, wherein the authenticating the command comprises authenticating a security token transmitted to the electronic device by the host computer.

17. The method of claim 15, wherein the authenticating the command comprises determining that the command is received from the connected host computer during an initialization of the electronic device.

18. The method of claim 15, further comprising:
overwriting a firmware stored in the storage location in the electronic device with another firmware transmitted from the connected host computer.

19. The method of claim 15, further comprising:
detecting the connection between the host computer and the electronic device;
wherein the command to enter the firmware update mode is received responsive to the detecting of the connection.

* * * * *